March 31, 1953 V. E. PRATT ET AL 2,633,057
MICROFILM CAMERA
Filed Sept. 23, 1949 3 Sheets-Sheet 1

INVENTORS
VERNEUR E. PRATT
GEORGE F. GRAY
BY WILLIAM A. PFAFF, JR.

Van Deventer & Shively
ATTORNEYS

March 31, 1953　　　V. E. PRATT ET AL　　　2,633,057
MICROFILM CAMERA
Filed Sept. 23, 1949　　　3 Sheets-Sheet 2
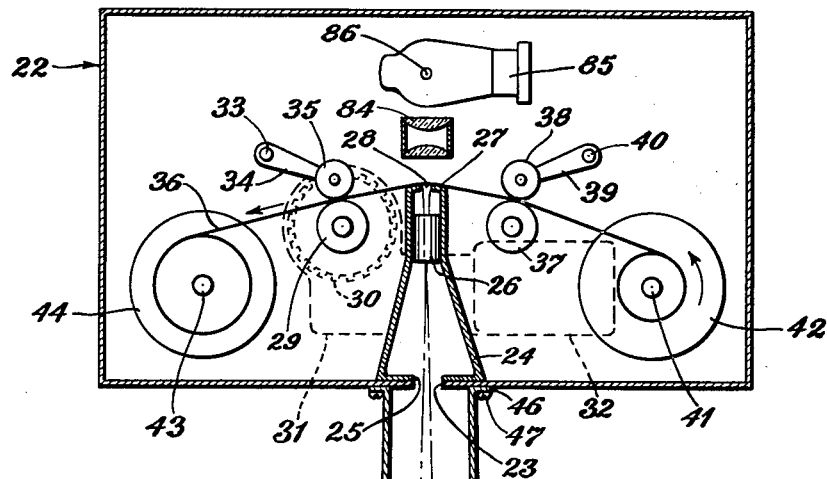
Fig. 3.
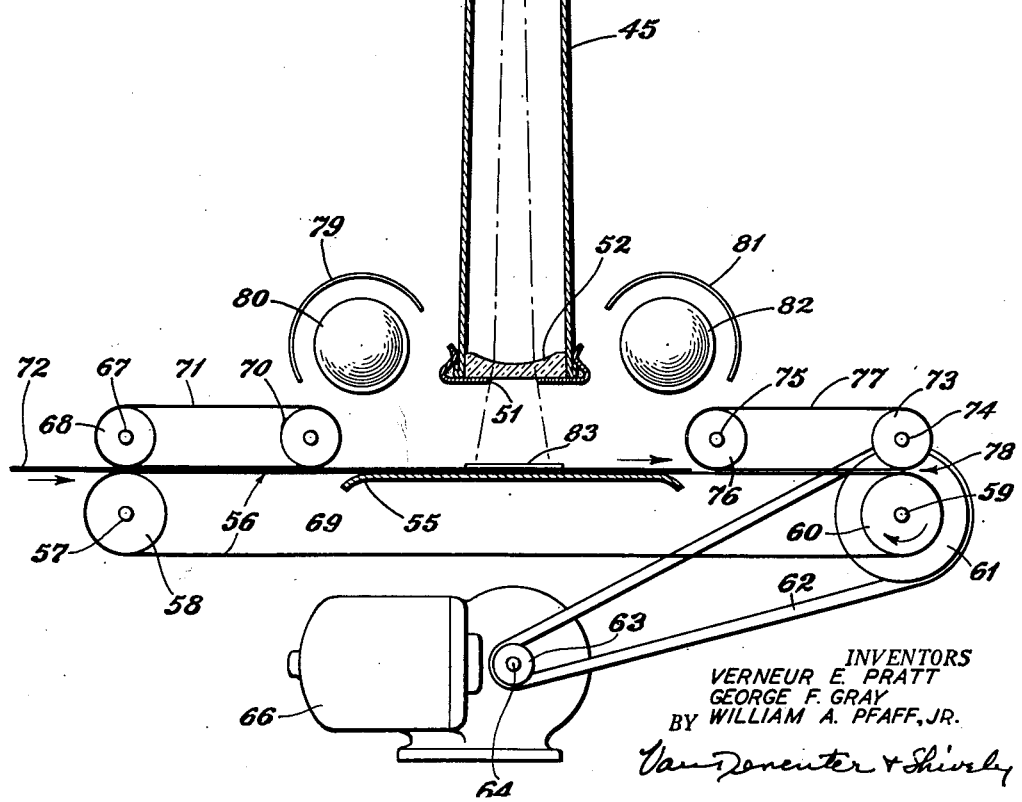
INVENTORS
VERNEUR E. PRATT
GEORGE F. GRAY
BY WILLIAM A. PFAFF, JR.
Van Deventer & Shively
ATTORNEYS

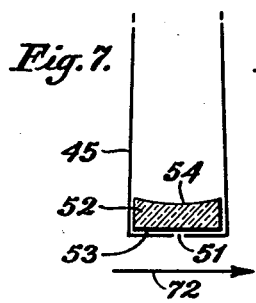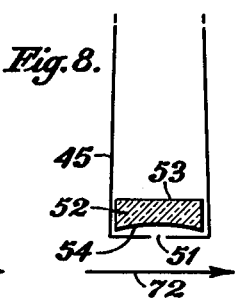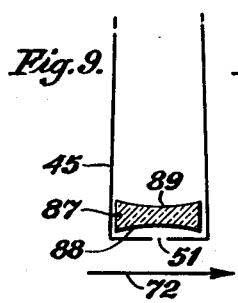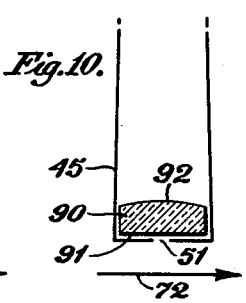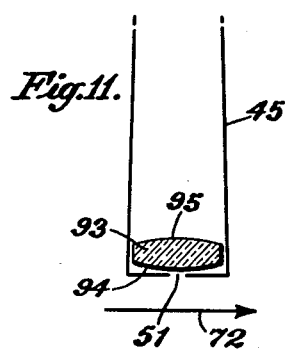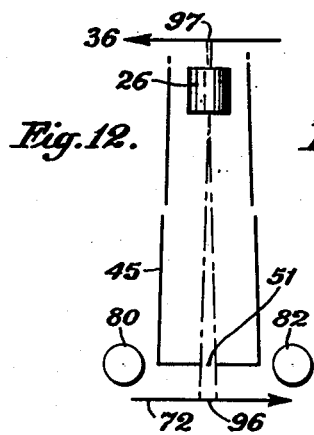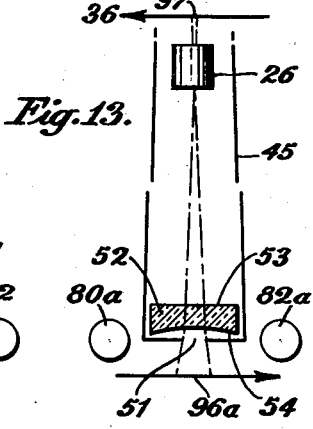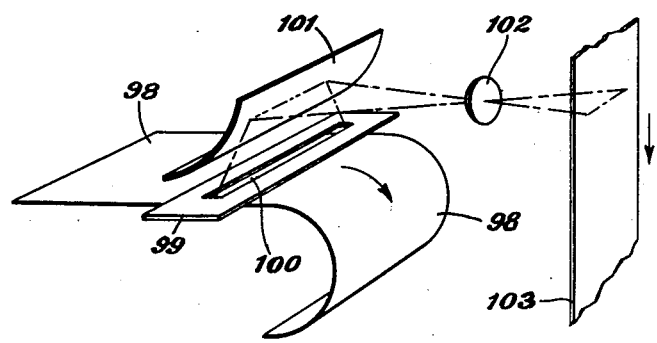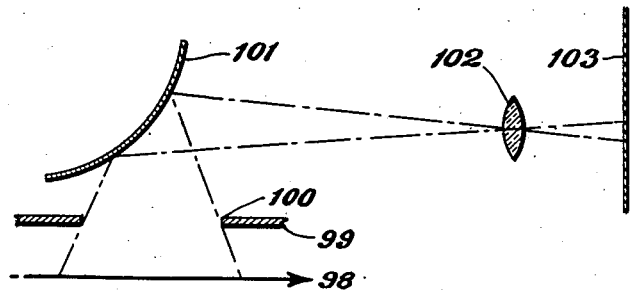

UNITED STATES PATENT OFFICE 2,633,057

MICROFILM CAMERA

Verneur E. Pratt, George F. Gray, and William A. Pfaff, Jr., Norwalk, Conn.

Application September 23, 1949, Serial No. 117,336

6 Claims. (Cl. 88—24)

This invention relates to improvements in cameras of the "flow" type for making microfilm negatives and is directed more particularly to a new type of microfilm camera which can produce negative images in which the scale is disproportionate to the dimensions of the copy being photographed.

This application is a continuation in part of application Serial No. 590,984, filed April 30, 1945, now abandoned, which included a document conveyor and means to drive the same, means to illuminate the documents as they pass through the field of view of the lens of the camera, a very narrow slit being provided between the spanned area and the objective lens; the film in said camera being moved at a rate of speed less than the rate of movement of the series of narrow bands of the slit images reflected by the documents through the narrow slit and through the lens to the film, with the result that the dimensions of the microfilm images on the film are substantially reduced lengthwise of the film and the resulting shrinkage due to the microfilm image being out of scale representing a substantial saving in the number of feet of film required to microfilm each thousand documents at a certain selected reduction ratio.

In application Serial No. 590,984 of two of the present co-inventors it was explained that since most documents to be microfilmed contain printed, typewritten, or handwritten matter, it was possible to feed the documents into the camera in such a way that the lines of the typewritten or other matter would be recorded on the microfilm parallel to its length so that the width of the letters or characters would be condensed, and yet the height of the letters or characters forming said matter would be proportional to the original height of the letters or characters on the documents themselves according to whatever reduction ratio the objective lens of the camera produced.

It was shown in said application Serial No 590,984 that microfilm made with such "shrunken images" was perfectly legible when enlarged because the human eye accepts condensed material due to the fact that recognition factor depends upon the length or height of the ascenders and descenders of typewritten, printed or handwritten words and sentences.

Since application Serial No. 590,984 was filed April 30, 1945, by two of the present co-inventors, laboratory experiments have shown that, while the method taught is practical and does result in perfectly legible microfilm images with a substantial saving in film per thousand documents passing through, the slit must be so narrow that, unless extremely high precision parts are used in the camera head and the conveyor movements, density bars and blur lines can occasionally be introduced into the film.

Therefore, one of the principal objectives of the present invention is the addition of certain prisms and mirrors which permit use of slightly wider slits and which produce perfect blurless microfilm without density bars by the use of camera heads and document conveyors constructed of parts of normal tolerances.

The term cylindrical lens employed herein is taken to mean an elongated transparent body the cross-section of which in one plane is rectangular and the opposite wide surfaces of which may be in various forms, for example, in one form one of these faces may be plane and the other concave, in another form one surface may be plane and the other convex, in another form both surfaces may be convex, and in another form both surfaces may be concave.

We have found, for example, that by placing a plano-concave cylindrical lens a few inches from the flowing documents on the copy conveyor and locating a slit in the light path immediately under this lens and parallel to it we can use less illumination to secure satisfactory density on the microfilm negative, because of the fact that the prism "covers" more of the flowing documents than would the slit alone. (See Figures 12 and 13.)

We have also quite successfully used a double-concave cylindrical lens of a slightly narrower radius but of the full width of the camera conveyor, in combination with a fairly narrow slit underneath and parallel to it. We find that such a lens also collects a greater quantity of light for transmission through the objective lens to the negative microfilm.

We have also experimented with and have obtained excellent results by the introduction of a convex mirror in the light path between the objective lens and the flowing copy on the document conveyor. When using this method we "flow" the film at right angles to the flow of the copy and introduce a fairly narrow slit just above the copy, as shown in Figures 14 and 15.

During the last three years since our pending application Serial No. 590,984 was filed, we have also been able to "blow back" or enlarge from shrunken image microfilm to silver paper images or photoprints which are exactly back to scale of the original documents. To accomplish this, we make this microfilm negative on a flow camera provided with an objective lens of the proper focal length, a document conveyor moving across the field of view of the lens and introduce either a plano-concave cylindrical lens, a double-concave cylindrical lens, or a convex mirror in the light path, further introducing a fairly narrow slit full width of the conveyor or of sufficient width to cover the document to be microfilmed, placing this slit within a few inches of the flowing copy. We then process this microfilm by developing, fixing and washing it.

In making this microfilm through the introduction of the plano-concave cylindrical lens, the double-concave cylindrical lens, or the convex mirror in the light path, we, of course, alter the ratio of the flow of the copy on the conveyor to the flow of the film in the camera head by whatever percentage of shrinkage of the microfilm is desired. For example, in a typical flow camera of the type taught in Patent No. 2,435,099, with a copy-to-film distance of 21 inches, using a 20 mm. lens, we secure a normal reduction ratio of 24×. If the copy conveyor is running at a rate of 960 inches per minute, the film in the camera head for normal microphotography is arranged to run at the rate of $\frac{1}{24}$ of 960 inches per minute, or 40 inches per minute. This would produce a microfilm image in which each dimension would be $\frac{1}{24}$ of the length or width of the flowing copy.

However, if we desire to shrink the image linearly on the microfilm, we maintain the conveyor speed of 960 inches per minute but so alter the speed of the microfilm flowing through the camera head as to produce the shrinkage we desire. If, for example, we wish a 50 percent shrinkage, we then move the film in the camera head at the rate of 20 inches per minute instead of 40 inches per minute.

Now to produce a flow enlargement from this shrunken image microfilm back to the exact scale of the original documents, we reverse this procedure and place our unexposed emulsion paper on a document conveyor operating at twice the speed at which the copy originally was flowed through, or, in the example above, at 1,920 inches per minute. In commercially constructed cameras it is sometimes easier to halve the speed of the flowing film through the camera head than to alter the speed of the conveyor itself, so that, using the example preceding, we could operate the conveyor at 960 inches per minute and permit the film to flow through the camera head at 20 inches per minute. In this operation the processed microfilm is illuminated usually by introducing a zirconium oxide point source of light through a series of condenser lenses, as taught in our co-pending application, Serial No. 62,942.

During this flow enlarging operation we can either employ the same cylindrical lens used when the microfilm was originally exposed, such as a plano-concave or double-concave or the convex mirror in the light path.

In our application, Serial No. 590,984, we found that the slit had to be so narrow that the amount of light required was beyond any commercial application due to the heat emitted from the various light sources tried; whereas, using the cylindrical lenses as disclosed herein permitted the use of a great deal less light and accordingly less wattage for illumination, which reduces the cost of the microfilming operation.

As shown in Figure 13, the use of these prisms permits the objective lens to "cover" more area on the flowing documents than would a narrow slit alone.

The radius of curvature of the concave glass cylindrical lens we use determines the distance such a lens must be placed from the document. In a practical flow camera of the type shown in our Patent No. 2,435,099, the following constants are used and are hereby given only by way of example:

Distance from film to document 21 inches.
Focal length of objective lens 20 mm.
Actual reduction ratio 24×.
Radius of curvature of plano-convex cylindrical lens 2 inches.
Distance prism to document 2 inches.
Ratio copy flow to film flow 36 to 1.

This results, we find, in the production of microfilm negatives in which the recorded images are shrunken longitudinally on the film approximately one-third more than laterally, with a consequent saving of approximately one-third of the length of the film. Thus if 300 feet of film are normally required on which to record images of a certain group of documents at 24×, then our shrunken images of the same documents made in accordance with disclosure herein can be photographed on 200 feet of the same film, a saving of 100 feet, or one-third.

In a practical flow camera of the type disclosed in Patent No. 2,435,099, when it is desirable to shrink the resulting microfilm images longitudinally of the film as much as 50 percent, we find that many constants can be used, one of which, by way of example, is as follows:

Distance from film to document 21 inches.
Focal length of camera lens 20 mm.
Reduction ratio 24×.
Radius of curvature of double-concave cylindrical lens 2 inches each side.
Distance lens to document 2 inches.
Ratio copy flow to film flow 48 to 1.

Another advantage of this method is that it not only saves in the cost of the film without increasing the reduction ratio, but it also saves, obviously, in the storage space required to store the resultant microfilm.

As was explained in application Serial No. 590,984, filed April 30, 1945, there comes a limit, at each stage of the art, where higher diameters of reduction result in unreadable microfilm. If a certain flow camera using the best lens possible to make can produce satisfactory microfilm images at, let us say, 40 diameters reduction, then the method herein disclosed can save in film cost and storage space the equivalent of microfilm recorded at 60 diameters reduction, provided the images are shrunken linearly of the film a full 50 percent.

Using the cylindrical lenses or mirrors of the present invention, we now shrink microfilm images longitudinally of the film as much as 50 percent, whereas, in our laboratory work, which resulted in application Serial No. 590,984, we were able, using only very narrow slits, to shrink the images up to 20%, and even that much shrinkage demanded an extremely high precision in the parts of the camera head and the conveyor and the use of unusually intense illumination means.

While at the present time we do not see any practical application in microphotography for stretching an image longitudinally of the film, as this would require more rather than less film consumption for any particular group of documents, we have been able experimentally to stretch the resulting microfilm images as much as 100 percent, using a cylindrical lens of the plano-convex type over a fairly narrow slit, as shown in Figure 10.

We have also discovered that these types of cylindrical lenses, either plano-convex or double-convex, can be used in the projection of flow enlargements on sensitive paper from processed microfilm negatives on which the images already are shrunk 50 percent, thus producing flow enlargements which are actually still shorter in length than can be conveniently made in a single operation of the microfilming camera through the use of a plano-convex or double-convex prism. To accomplish this, the ratios between the copy flow and the film flow are still further increased.

Other objects and advantages of our present invention will be apparent to those skilled in the art upon a study of the following specification and the accompanying drawings.

Referring to the drawings, which are more or less diagrammatic and which are given by way of example:

Figure 4:
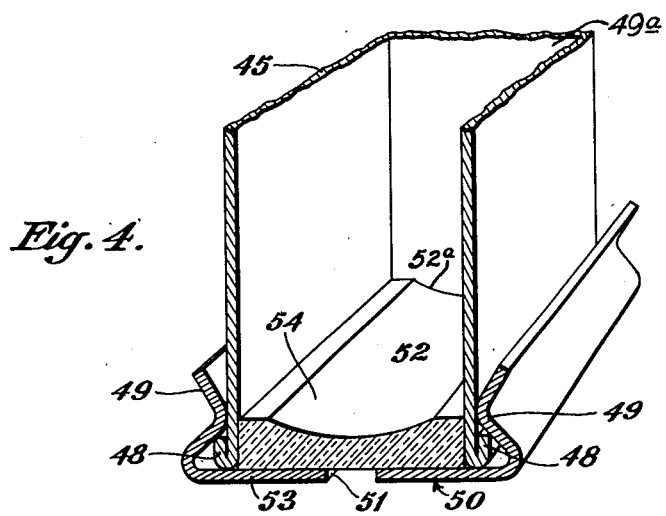
Figure 5:
Figure 6:
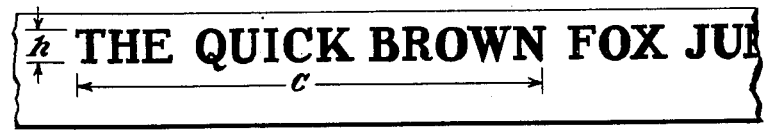

Figure 3 is a diagrammatic representation of our new and improved flow camera which includes a light source for illuminating the documents when photographing and which shows a light source in the camera for illuminating the negative when the device is to be used as a flow enlarger. When the device is used as a camera, the images of the documents on the conveyor are foreshortened or shrunken lengthwise of the film, and when the device is used as a flow enlarger and shrunken negatives are used, the enlarged reproductions thereof are replicas of the original documents;

Figure 4 is an enlarged detail of the arrangement of the slit with respect to the linear plano-convex prism light gathering and transmitting member;

Figure 5 is a view showing lettering constituting several words;

Figure 6 is a view of the same words in which the height of the letters is maintained but in which the widths of the words or letters is shrunken or narrowed.

Figure 7 is a diagrammatic representation of the lower portion of the light tube of a flow camera, showing a plano-concave cylindrical lens or light transmitting member positioned with its plane surface adjacent to the slit formed in the end of said tube.

Figure 8 is a diagrammatic representation of the lower portion of the light tube of a flow camera, showing a plano-concave cylindrical lens or light transmitting member positioned with its concave surface adjacent to the slit formed in the end of said tube.

Figure 9 is a diagrammatic representation of the lower portion of the light tube of a flow camera, showing a double-concave cylindrical lens or light transmitting member positioned with one concave face adjacent to the slit formed in the end of said tube.

Figure 10 is a diagrammatic representation of the lower portion of the light tube of a flow camera, showing a plano-convex cylindrical lens or light transmitting member positioned with its plane face adjacent to the slit formed in the end of said tube.

Figure 11 is a diagrammatic representation of the lower portion of the light tube of a flow camera, showing a double-convex cylindrical lens or light transmitting member positioned with one of its convex faces adjacent to the slit formed in the end of said tube.

Figure 12 is a diagrammatic representation of a flow camera showing a slit of a normal width and without our new and improved cylindrical lens positioned adjacent thereto, showing the width longitudinally of the document spanned by said slit.

Figure 13 is a view similar to Figure 12, except that our new and improved cylindrical lens is positioned adjacent to the slit, and showing the increased width of the document spanned by the combination of the slit and the prism.

Figure 14 is a perspective view showing a method of shrinking or stretching an image in one direction only and employing a convex or concave mirror.

Figure 15 is a diagrammatic representation of the arrangement shown in Figure 14.

Figure 1:
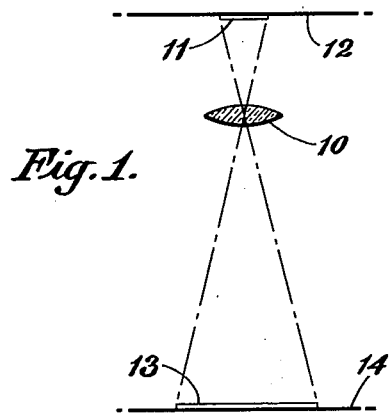
Figure 1 is a diagram showing a lens forming an image of a size proportional to the relative distances from the lens to the object and from the lens to the image.
Figure 2:
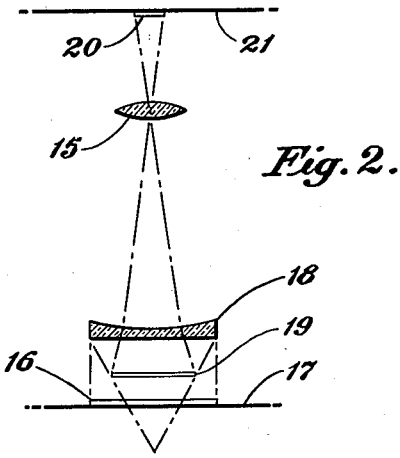
Figure 2 is a diagram similar to Figure 1, except that a cylindrical lens is shown creating a virtual erect and reduced image which is also reduced by the lens and projected onto the film or the light sensitive medium.

Referring first to Figures 1 and 2, a lens 10 forms an image 11 on a film 12. This image is of an object 13, such as a printed character or letter on a document 14. In Figure 1, the lens 10 forms an image of a size proportional to the relative distances from the lens to the object and from the lens to the image.

In Figure 2, a lens 15 corresponds to the lens 10 of Figure 1, and between it and a character 16 on a document 17 is our cylindrical lens 18, which is in effect a cylindrical lens which creates an image at 19 which may be said to be "virtual, erect and reduced." This image is further reduced by the camera lens 15 in forming an image 20 on the film 21. Thus, the image 20 is shorter than the image 14, even though the characters 13 and 16 are identical in size, but since 18 is a cylindrical lens, the image in a plane at 90° with respect to the plane shown in Figure 2 (the image 20) is of the same size in that plane as that of the image 14. Therefore, the image 20 is foreshortened in the plane shown in Figure 2 as compared with the image 11 shown in Figure 1 in a like plane.

In the flow camera, the documents 14 (of Figure 1) or 17 (of Figure 2) move in directions opposite to the movements of the films 12 and 21, respectively, at rates proportionate to the optical reductions. That is, the film strip 21 moves more slowly than the film 12, thereby flowing successive images onto the film.

Referring now to Figure 3, a casing 22 has an aperture 23 formed therein. Within the casing 22 is a hollow tubular support 24 having an opening 25 in the lower end thereof matching the aperture 23. Within the support 24 is an objective lens 26. The upper end of the support 24 is in the form of a curved shoe 27 having a central aperture 28 formed therein. This aperture is generally rectangular in form and its width in a plane at right angles to the plane shown in Figure 3 is equal to the width of the negative to be produced in the camera. Spaced to one side of the shoe 27 is a roller 29, which may be termed a "drive roller." This roller is driven by a gear 30, which forms a part of a gear reduction unit 31 driven by a motor 32. A post 33 carries a yoke 34, upon which is journaled a free roller 35. Springs means (not shown) are positioned on the post 33 and urges the free roller into firm contact with the drive roller 29, so that when the film 36 is between them the film is positively driven.

Spaced on the other side of the shoe 27 is a roller 37, which may be a free roller, and cooperating with this roller is a second roller 38 carried on a yoke 39 supported on a post 40. Spring means (not shown) on the post 40 urges the yoke 39 and the roller 38 carried thereby toward the free roller 37.

A reel shaft 41 is mounted in the casing 22 and it may support a supply reel 42. Oppositely disposed in the casing 22, with respect to the reel shaft 41, is a reel shaft 43, which is operatively connected to the gear reduction unit 31. A take-up reel 44 mounted on the shaft 43 serves to take up the film which is drawn over the shoe 27 by the rollers 29 and 35.

A light tunnel 45, which is substantially wider at the lower end thereof than at the upper end in a plane 90° with respect to the plane of Figure 3, has flanges 46 at the upper end thereof and is secured to the casing 22 in any suitable manner, for example, by means of screws 47. The lower end of the light tunnel 45 (see also Figure 4) has its edges 48 folded back to form a ledge thereabout. An aperture plate 50 has upturned edges 49, which clip over the edges 48 of the light tunnel. A slot or slit 51 is formed in the aperture plate substantially midway of the light tunnel. In the embodiment shown, the width of the slit is $\frac{3}{16}''$.

Positioned in the lower end of the light tunnel 45 is our light transmitting element of cylindrical lens 52, which consists of an elongated rectangular piece of optical glass having a plane lower surface 53, which rests on the aperture plate 50. The width of the element 52 is such that it may freely slide laterally into the bottom of the light tunnel 45, and as seen in Figure 4, the end 52a of the element 52 abuts the rear wall 45a of the light tunnel 45. The upper surface 54 of the member 52 is concave and in the embodiment shown it is a curve having a radius of approximately 2''. The length of the element 52 in a plane 90° with respect to the planes shown in Figures 3 or 4 is approximately 15'' in the embodiment shown.

Spaced apart from the lower end of the light tunnel 45 is a support 55, over which a plurality of belts, such as the belt 56, passes. These belts are carried on pulleys which are identical. Therefore, a description of one set of them is deemed sufficient for all. A shaft 57 carries a plurality of pulleys 58 in spaced relation to each other and each of these pulleys is spanned by a belt 56. The shaft 57 is spaced apart horizontally from the support plate 55.

Spaced apart from the support plate 55 on the other side thereof is a shaft 59, which also carries a series of spaced pulleys 60, which are identical with the pulleys 58 and which are also spanned by the belts 56. Carried on the end of the shaft 59 is a pulley 61, which is connected by means of a belt 62 to a smaller pulley 63 carried on the shaft 64 of a gear reduction unit 65. An electric motor 66 is operatively connected to the gear reduction 65 and rotates the pulley 61 in a clockwise direction, as seen in Figure 3. When the pulley 61 rotates, the shaft 59 and all of the pulleys 60 which are fixed thereon are also moved, thereby the belts 56 are moved so that their upper portions traversing the support plate 55 are moved to the right, as seen in Figure 3.

Supported above the shaft 57 is a shaft 67 carrying pulleys 68 and spaced apart from the shaft 67 is a second shaft 69, which carries a series of like pulleys 70. The pulleys 68 and 70 are spanned by belts 71, which respectively contact the belts 56 so that documents, such as the document 72, are fed between the belts 56 and 71 and pass to the right, as seen in Figure 3. Spaced apart from the shaft 59 is a shaft 73, which carries a plurality of spaced pulleys 74 like the pulleys 60, which are carried on the shaft 59, and spaced apart horizontally from the shaft 73 is a shaft 75, which carries a plurality of spaced pulleys 76, which are like the pulleys 74. Spanning the pulleys 74 and 75 is a series of belts 77. These belts contact the belts 56, and the documents, after they pass through the field of view of the camera, pass between the belts 56 and 77 and are discharged therefrom at the point 78.

The belts, the pulleys, the support plate 55 and the motor and gear reduction drive constitute a document conveyor. To one side of the lower end of the light tunnel 45 is a source of illumination 80, which has positioned adjacent thereto a reflector 79, which directs the light downwardly upon the conveyor, so that documents being conveyed by the latter have their upper surfaces illuminated. On the other side of the light tunnel 45 is a source of illumination 82, which is provided with a reflector 81 for directing light downwardly upon the upper surface of the conveyor. It will be noted that the lights from both sources overlap one another and therefore both illuminate the documents more brilliantly within an area 83, which is a little wider than the field of view of the camera, which is defined by a slit 51 and the member 52.

Positioned within the casing 22 is a condensing lens system 84 and also positioned within the casing 22 is a base 85, which supports a source of illumination 86.

Although we show in the drawings a so-called "crater lamp," as the source of illumination, it will be understood that we may use any other suitable source of illumination. The center of the light source is in line with the optical center of the objective lens 26, the slit 28, and the condensing lens 84. When it is desired to use the device as a "flow enlarger," the negative film is carried on the reels positioned on the reel shafts 41 and 43 and it is engaged and fed by the rollers 29 and 35 and it passes over the shoe 27. A sensitized roll or strip of paper, for example, is carried by the conveyor, so that enlarged slit images from the negative are projected onto this strip or roll of sensitized paper.

When the device is used as a camera, the light source 86 is extinguished, because obviously the interior of the casing 22 would have to be dark when the documents are being photographed, and said documents would be carried on the document conveyor.

When the device has the proportions given by way of example in connection with Figure 2, the film is moved by the drive roller 29 at a rate approximately two-thirds the rate it would be moved if the plano-cylindrical light transmitting member were omitted. This amounts to a movement of approximately two-thirds the rate of movement of split images of the documents along the focal plane of the lens 26. The documents 72 are fed into the conveyor and the element 52 appears to produce a virtual image of a portion of the document, which is erect and which is reduced in dimension, between itself and the surface of the document on the conveyor. Now, when this virtual image is projected onto the film in the camera, it is further reduced by the objective lens 26. Now, with the film being moved at two-thirds its normal speed, the images of the documents photographed thereon are decreased dimensionally by one-third, lengthwise of the film.

We have found that the element 52 may, instead of being plano-concave, be concavo-concave, and yet produce similar and satisfactory results. We have also found that by utilizing an element 52, such as that disclosed herein, we can reduce the rate of film feed to the extent that the images are reduced approximately 50%, and yet they are perfectly legible. This means that if the film were run at half its normal speed and the images were recorded thereon, shrunken 50% longitudinally of the film, that a 50% saving in film may be effected. The documents are fed into the document conveyor so that the image of the document on the film has the top edge adjacent to one edge of the film and the bottom adjacent to the other edge of the film, and therefore the shrinkage of each document image is from side to side. This being the case, the proportionate heights of the letters forming the printed matter on the documents is not reduced. The reduction is only in width.

As an illustration of this, reference is made to Figures 5 and 6. In Figure 5, it is assumed that the words "THE QUICK BROWN" are not shrunken proportionately in any way and the length of these words designated by the letter "A" lengthwise of the film is shown. Now, in Figure 6, the same words have been shrunken lengthwise of the film to a dimension "C," which is approximately two-thirds the dimension "A." However, in both instances the height "h" of the letters is unchanged. Therefore, it is just as easy to read the words shown in Figure 6, which have been shrunken by two-thirds, as it is to read the same words in Figure 5, which have not been shrunken lengthwise of the film.

As stated above, we have produced with apparatus employing an element such as the element 52, negatives in which the images of the documents were shrunken fifty percent lengthwise of the film. It is obvious that by changing the constants and dimensions of the element 52, we can produce an even greater shrinkage of the images on the film by the principle disclosed herein.

Figures 7 to 11, inclusive, show a light tunnel or light tube 45, the slit 51 and prisms or light transmitting elements, the opposite surfaces of which are several combinations of forms, for example, in Figure 7 the plano-concave cylindrical lens member 52, which was described in connection with Figures 3 and 4, as shown.

Figure 8 shows the light tube 45 with a plano-concave cylindrical lens 52, in which the concave surface 54 is facing the slit 51 instead of the plane surface 53, as shown in Figure 7. In Figure 8 the plane surface 53 faces the objective lens, which is above in the arrangement herein shown and described.

Figure 9 shows the light tunnel or tube 45 with a double-concave cylindrical lens member 87 positioned therein, one concave surface 88 being adjacent to the slit 51 and the other concave surface 89 facing the objective lens, which is in the upper end of the light tunnel 45.

In Figure 10 the light tunnel 45 has positioned therein a plano-convex cylindrical lens 90, the plane surface 91 of which is adjacent to the slit 51 and the convex surface 92 of which faces the objective lens above.

In Figure 11 the light tunnel 45 has positioned therein a cylindrical lens 93 having a convex surface 94 adjacent to the slit 51 and the opposite convex surface 95 facing the objective lens in the upper end thereof.

Figures 12 and 13 are diagrammatic representations showing a comparison of the results obtained when using a slit alone, in a flow camera, and the results obtained when using one of our cylindrical lenses.

In Figure 12 the document 72 is illuminated by lamps 80 and 82. The light tunnel 45 has a slit 51 formed in the lower end thereof and is in spaced relation to the document 72. An objective lens 26 is positioned in the upper end of the light tunnel 45 and across the focal plane of this lens is a moving film 36 which, it will be noted, moves in a direction opposite to the movement of the document 72. The area 96 indicated in Figure 12 is the area spanned by the slit 51 and this area, when projected onto the film 36, is indicated by the numeral 97.

In Figure 13 the arrangement is identical, except that the light tunnel 45 has positioned in the lower end thereof, adjacent to the slit 51, one of our new and improved cylindrical lenses 52, which, in this instance, is plano-concave cylindrical lens the plane surface 53 of which faces the objective lens 26 and the concave surface 54 of which faces the slit 51. It will be noted by comparing these two figures that the area 96a, in Figure 13, is substantially wider than the area 96 in Figure 12. Therefore, the illumination obtained from the lamps 80a and 82a (Figure 13) can be much less than the illumination obtained from the lamps 80 and 82 to secure a desired density on the film 36.

In Figures 14 and 15 a modified arrangement is shown for producing images shrunken or stretched in one direction only with respect to the other direction. In Figure 14 the document or the like 98 is moved beneath a slit 100 in a plate 99 and is suitably illuminated, although the illumination is not shown in these figures, for the sake of clarity. A convex mirror 101 picks up via the slit 100 an image of the area of the document 98 immediately beneath the slit, and this image is projected via an objective lens 102 to a film 103. In the arrangement shown in Figures 14 and 15, the light rays are picked up in one plane and are delivered in a plane which is 90° with respect to the first plane. In other words, the copy 98 moves in a horizontal plane and the film 103 moves in a vertical plane, and, as stated above, the convex mirror produces an image shorter than normal.

By substituting a concave mirror for the convex mirror 101, the image produced would be longer than normal instead of shorter than normal.

In the arrangements herein shown and described, anyone of the cylindrical lenses shown in Figures 3 to 11, inclusive, is positioned adjacent to the slit at the lower end of the light tunnel. However, it is obvious that this element may be placed in other positions in the optical path. For example, they may be spaced a greater distance from the slit. It will also be understood that such elements may be positioned between the objective lens and the film. In the latter case, the plano-convex element would be substantially smaller and only a fraction of an inch away from the flowing film. For example, we can use such an element .083 inch from the film and still employ a short-focus objective lens.

It is to be understood that the above detailed description of the present invention and the modifications thereof are intended to disclose embodiments thereof to those skilled in the art, but the invention is not to be construed as limited in its application to the details of construction and the arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. In a flow camera, a conveyor for documents disposed on a horizontal plane, means to drive said conveyor, a camera comprising a light tight casing having film supporting and conveying means therein and having an objective lens thereon the field of view of which includes an area of said conveyor, a light tunnel fixedly mounted on said camera and extending downwardly toward said conveyor, a closure plate detachably carried on the lower end of said tunnel and having a slot formed therein, illuminating means above the lower end of said tunnel for illuminating said area and consequently any documents on said conveyor passing through said area, and a cylindrical lens having a width equal to the width of the interior of the lower end of said tunnel in the direction of the movement of said conveyor, so that its center is aligned with the optical axis of said objective lens, said cylindrical lens also having at least one curved surface and resting upon said closure plate, said cylindrical lens being adapted to be slid into said tunnel through one lateral wall thereof and adapted to be arrested in operative position by the opposite lateral wall, and said cylindrical lens also being adapted to be slid out from said tunnel laterally in the opposite direction.

2. In a flow camera, a conveyor for documents disposed on a horizontal plane, means to drive said conveyor, a camera comprising a light tight casing having film supporting and conveying means therein and having an objective lens therein the field of view of which includes an area of said conveyor, a light tunnel rigidly and fixedly secured on said camera and extending downwardly to a point adjacent to said conveyor, said tunnel having beads formed on and extending outwardly on opposite end edges thereof, a closure plate carried on the lower end of said tunnel, having clips on opposite edges thereof detachably engaging said beads, said closure plate also having a slot formed therein, said slot being centralized with respect to said optical axis when said plate is engaged with said beads, illuminating means above the lower end of said tunnel for illuminating said area and consequently any documents on said conveyor passing through said area, and a cylindrical lens having at least one curved surface and resting upon said closure plate, the sides of said tunnel at the lower end thereof being substantially the width of said cylindrical lens and serving to centralize the latter therein, said cylindrical lens being adapted to be slid into said tunnel through one lateral wall thereof and adapted to be arrested in operative position by the opposite lateral wall and said cylindrical lens also being adapted to be slid out from said tunnel laterally in the opposite direction.

3. In a flow camera, a conveyor for documents disposed on a horizontal plane, means to drive said conveyor, a camera having film supporting and conveying means and having an objective lens the field of view of which includes an area of said conveyor, a light tunnel extending downwardly to a point adjacent to said conveyor, a slotted closure plate carried on said tunnel, said plate having projections which engage the outer surfaces of said tunnel at the lower end thereof and centralize the slot therein with the optical axis of said first lens, illuminating means above the lower end of said tunnel for illuminating said area and consequently any documents on said conveyor passing through said area, and a cylindrical lens having at least one curved surface, said lens resting upon said closure plate, the sides of said tunnel at the lower end thereof being substantially the width of said cylindrical lens and adapted to engage and centralize said cylindrical lens with said axis.

4. The invention according to claim 3 in which the lower end of said tunnel has oppositely disposed ledges formed thereon, and in which opposite ends of said plate are devised to engage said ledges and to be retained on said end thereby.

5. The invention according to claim 3 in which said light tunnel is comprised of a portion carrying said first lens and forming an integral part of said camera, and a second portion detachably secured on said camera and adapted to be removed without disturbing said first portion and the lens carried thereby.

6. The invention according to claim 3 in which said light tunnel is comprised of two portions, one of which is inside said camera and the other of which is outside said camera, said first lens being carried by one of said portions and said second lens being carried by the other.

VERNEUR E. PRATT.
GEORGE F. GRAY.
WILLIAM A. PFAFF, Jr.

REFERENCES CITED

The following references are of record in the file of this patent:

UNITED STATES PATENTS

| Number | Name | Date |
|---|---|---|
| 753,351 | Beidler | Mar. 1, 1904 |
| 1,186,717 | Walker | June 13, 1916 |
| 1,767,790 | Gerlach | June 24, 1930 |
| 1,963,480 | Whitman | June 19, 1934 |
| 2,001,005 | Whitaker | May 14, 1935 |
| 2,081,299 | Hill | May 25, 1937 |
| 2,141,317 | Sabel | Dec. 27, 1938 |
| 2,143,059 | Dimmick | Jan. 10, 1939 |
| 2,292,825 | Dilks | Aug. 11, 1942 |
| 2,314,272 | Grudin | Mar. 16, 1943 |
| 2,443,004 | Horwitz | June 8, 1948 |
| 2,458,860 | Kogel | Jan. 11, 1949 |

FOREIGN PATENTS

| Number | Country | Date |
|---|---|---|
| 417,645 | Great Britain | Oct. 1, 1934 |
| 775,516 | France | Oct. 15, 1934 |